3,395,082
TEST COMPOSITION DEVICE AND METHOD FOR DETECTING UREA IN AQUEOUS FLUIDS

Raymond L. Mast, Elkhart, Ind., assignor to Miles Laboratories, Inc., Elkhart, Ind., a corporation of Indiana
No Drawing. Continuation-in-part of application Ser. No. 386,063, July 29, 1964. This application June 5, 1967, Ser. No. 643,404
18 Claims. (Cl. 195—103.5)

ABSTRACT OF THE DISCLOSURE

Improved test composition, device and method for detecting urea in aqueous fluids comprising urease, a pH indicator, a buffer for controlling the pH of the test composition, and, as a color stabilizer, albumin. The test composition is preferably incorporated with a carrier member such as bibulous filter paper.

CROSS REFERENCES TO RELATED APPLICATIONS

This is a continuation-in-part application based on copending U.S. application Ser. No. 386,063 filed on July 29, 1964, and now abandoned.

BACKGROUND OF THE INVENTION

A means for the accurate determination of urea in fluids is of great importance not only in the early detection of physiological disorders by estimating the urea content of body fluids, but also in industrial fluids and agricultural products where the urea content must be controlled within certain limits.

For example, a urea detecting means is extremely useful to an individual with a known kidney dysfunction who must control his diet or otherwise regulate his protein metabolism and must frequently be guided in this regard by a regular check on the concentration of his blood urea. But beyond its usefulness in regular testing in known kidney dysfunction by both patients and physicians, a urea indicator can also be used efficiently in routine urea analyses of body fluids in hospitals and physicians' offices. Moreover, in the industrial area, urea is an important addition to process fluids such as plating baths and a quick means to determine the concentration of urea therein is of great value. Urea itself is used as a fertilizer and a quick means for assaying this material is important as a control measure in its production and use.

Such means for the determination of urea nitrogen in fluids, whether the fluids be industrial or physiological, is of greatest value, if the test method is conveniently rapid, reliable and simple enough for the technician to learn with ease. Moreover, in the case of medical diagnosis, the method must be accurate enough to serve the clinician and sensitive enough to reflect variations in the patient's condition. Additionally and importantly, any test composition and color developed therewith must be adequately stable.

DESCRIPTION OF THE PRIOR ART

Procedures for the determination of urea in fluids are well known in analytical chemistry. One such procedure utilizes chemical hydrolysis and requires special apparatus not always available in a routine laboratory. Another procedure employs a direct colorimetric reaction of urea in a protein-free filtrate with an organic reagent such as diacetyl monoxime. Still another involves a test which depends on the action of the enzyme urease to convert urea to an ammonium salt which is measured by titration or nesslerization. These prior procedures have the disadvantage that they all require a considerable amount of skill and familiarity with complicated laboratory techniques.

More recently, a highly sensitive enzymatic type test composition for the colorimetric determination of urea in fluids has been developed which has greatly simplified these determinations. This particular test composition, which, in one of its more particular embodiments comprises a bibulous paper strip impregnated with active ingredients, is capable of producing a color change when contacted with a fluid containing urea. The various colors or hues produced correspond to various concentrations of urea present in the fluid. If the hue produced is interpreted immediately after formation, an exceptionally accurate urea determination is possible. However, if the interpretation of the color or hue is delayed for up to as long as 60 seconds, the urea determination becomes erratic. In many instances an immediate color interpretation is not always conveniently possible, and therefore a composition which can accurately reflect the urea concentration even after a delay of up to 60 seconds is most desirable and beneficial.

OBJECTS OF THE PRESENT INVENTION

It is therefore a primary object of this invention to provide an improved colorimetric detecting means which possesses high specificity and sensitivity for determining urea in fluids and is highly color stabilized.

Another object of this invention is to provide a color stabilized colorimetric type test composition which is capable of detecting urea when the quantity of fluid available is limited.

SUMMARY OF THE INVENTION

This invention specifically accomplishes these objects by providing a composition which, in addition to being simple, rapid and extremely sensitive, is color stabilized.

This invention comprises a unique combination of an enzyme system, an indicator system, a color stabilizer and a buffer system for providing the system with an optimum pH environment. The combined systems in conjunction with this color stabilizer cooperate in a manner such that when the enzyme system acts upon urea present in a fluid being tested, the indicator system undergoes a stabilized color change which will accurately reflect the concentration of urea present in said fluid.

The basic enzymatic reaction underlying this invention is known, especially in the instance where the enzyme system contains urease. Urease catalyzes the hydrolysis of urea to produce principally ammonia and carbon dioxide and/or ionized species thereof, depending upon the prevailing pH conditions of the enzyme reaction system. This enzymatic hydrolysis of urea can be simply represented by the following reaction sequence:

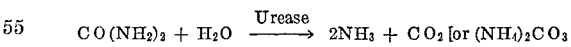

$$CO(NH_2)_2 + H_2O \xrightarrow{Urease} 2NH_3 + CO_2 \text{ [or } (NH_4)_2CO_3\text{]}$$

A product of this hydrolysis can be determined by means of an indicator system. For example, when the indicator system includes a pH indicator comprising a dye that is color sensitive to changes in pH, contact of said system with a product of this hydrolysis produces a color change in said dye which can be represented by the following reaction sequence:

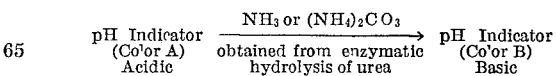

$$\text{pH Indicator (Co'or A) Acidic} \xrightarrow[\text{hydrolysis of urea}]{NH_3 \text{ or } (NH_4)_2CO_3 \text{ obtained from enzymatic}} \text{pH Indicator (Co'or B) Basic}$$

Unless Color B has been color stabilized, color fading will occur.

Description of the preferred embodiments

The composition of this invention can be color stabilized by introducing into the composition a color stabilizer comprising an albumin. This material may be defined as a proteinaceous material soluble in the absence of salt at the isoelectric point and coagulated by heat. Exemplary of the albumins are egg albumin or ovalbumin, serum albumin and myoalbumin. Numerous other albumins found in the fluids of plants and animals can also be used. The concentration of albumin added will generally be less than 10% and greater than 0.1% based on the total weight of the composition. However, an albumin concentration of between 1% and 5% by weight is preferred.

The exact chemical mechanism of this novel color stabilization is not known, but it is believed that the albumin somehow forms a stable adsorption product with the dyestuff pH indicator.

Although most of the common buffer systems may be utilized, in order to ensure maximum urea sensitivity while at the same time effecting the desired degree of pH control, a buffer capable of producing ammonium ions is preferably used in the composition of this invention. In using this buffer system, it has been found that a relatively small amount of ammonium salts, released by the enzymatic hydrolysis of urea, produces, or at least allows, a relatively large change in the pH of the composition. The result of such a phenomenon is that the composition, is sensitive to small incremental changes in urea concentration.

In the present invention, the ammonium ion producing buffer is utilized to provide the test composition during use with an optimum pH range for both the tautometric activity of the indicator and the enzymatic activity of the urease. In regard to the indicator material, the pH of the system is preferably initially set in a range betwen the midpoint of the transition interval of the indicator and a point adjacent to and on the acid side of this transition interval. The transition interval is defined as that pH range over which an indicator will exhibit a color change. For example, for bromthymol blue the transition interval lies between pH 6.0 and 7.6. Therefore, the midpoint of the transition interval of bromthymol blue is 6.8. In this illustration a pH adjacent to the transition interval of bromthymol blue, but on the acid side thereof would be a pH of slightly below 6.0. Although the above noted range is preferable, the pH of the system may initially be set to any point within the transition interval of the indicator whereby an increase in pH would cause a color change. Such an embodiment, however, utilizes a smaller proportion of the transition interval of the indicator material and consequently makes quantitation over a broad range of urea concentrations more difficult.

The second consideration involved in selecting the optimum pH conditions for the test composition resides in the activity of urease under various pH conditions. In this regard it has been found that the optimum pH for urease depends on the particular buffer used, concentration of substrate, ionic strength, and so forth. Generally, however, it can be stated that although urease is active over a relatively broad pH range, it is preferable to buffer the composition in a range of from about pH 5 to about pH 9.

In practice, because of the impracticalities involved in measuring pH in a dry test system such as when the present test composition is incorporated with a carrier member or when such a system is in use, as used herein, the above noted pH parameters apply to the test composition solution used to prepare the dry composition or device.

In the preferred composition utilizing an ammonium ion producing buffer there are a variety of compounds which may be used to buffer the composition to the proper pH. These ammonium ion producing buffers may be generically classified as ammonium salt forming nitrogen compounds and include the ammonium salts of weak organic and inorganic acids as well as amines and amine salts of such acids. Moreover, the compound must be a solid or at least a high boiling point liquid at room temperature. Examples of such buffers include ammonium citrate, ammonium lactate, ammonium oxalate, ammonium benzoate, ammonium acetate, ammonium salicylate, ammonium stearate, ammonium propionate, ammonium butyrate, ammonium phosphate, tris(hydroxymethyl) aminomethane (TRIS), 2-amino - 2-methyl - 1,3-propanediol, imidazole, 4-aminopyridine, 2-amino-2-methyl-1-propanol, hexamethylenediamine, substituted imidazoles, and acid salts of said amines, and the like as well as mixtures of two or more of such buffers.

It has been found that tris(hydroxymethyl)aminomethane (TRIS) and its acid salts are preferable buffers for use in the present invention.

The amount or proportion of buffer used in the present test composition depends upon the buffering capacity of the particular substance selected and is well within the experimental purview of one skilled in the art of making and using chemical test systems.

Although a wide variety of pH indicators may be used in the present invention, considering the hereinabove noted pH parameters, the preferable indicators are those which have a transition interval within the optimum pH range for urease activity, i.e., pH 5 to pH 9. Since the present invention resides in utilizing albumin as a color stabilizer, consideration must be given to selecting an indicator which does not exhibit the so-called protein error phenomenon, or if such an indicator is used, compensation must be made for the pH shift due to the presence of this proteinaceous material. Exemplary of the indicators which may be used are bromthymol blue, bromcresol purple, dichlorosulphonphthalein, 6.8-dinitro-2,4-quinazolinedoin, alizarin, 2-(2,4-dinitrophenylazo)-1-naphthol 3,6-disulfonic acid and the like.

It has also been found that the sensitivity and overall quality of the composition of this invention can be further improved by the addition of a sensitizing agent such as an aliphatic amide having a melting point of below about 150° C. Therefore, as used herein, the term sensitizing agent is used to define an adjuvant to the composition which not only allows a more facile quantitation of urea but also improves the overall elegance of the strip and general appearance of the color produced by the presence of urea in the fluid under test. For example, the smoothness and uniformity of color developed by the test composition is dramatically improved by the addition thereto of a sensitizing agent. Preferred sensitizing agents include saturated and unsaturated aliphatic amides containing from about 2 to about 4 carbon atoms. Examples of such sensitizing agents include acetamide, propionamide, acrylamide, butyramide and the like.

The concentration of sensitizing agents used can be varied over a relatively wide range. Generally a concentration of about 0.5% to 10% and higher based on the total weight of the composition can be used without denaturing the urease. However, a concentration of sensitizing agent such as acetamide of about 1.5% to 4.0% is preferred.

The compositions of this invention can be incorporated into various forms of test devices. In a preferred embodiment, bibulous paper strips are impregnated with a test composition as described herein. In use, the resulting test device is contacted with a fluid to be tested and the product of the enzymic reaction, if any, is determined colorimetrically. When the impregnated bibulous strip is contacted with a drop of blood containing urea, for example, the enzyme system having urease activity catalyzes the hydrolysis of the urea present in the blood with the resulting formation of ammonia, carbon dioxide and possibly other reaction products. The quantity of urea hydrolyzed will cause a certain increment of pH increase which, in turn, causes a color change in the indicator. A correlation between color change and urea concentration can be made to provide a highly sensitive quantitative determination of urea. For example, when bromthymol blue is used in the composition of this invention, the various shades of color between yellow and blue (the colors within the transition interval of bromthymol blue) can be correlated to correspond to different urea levels, thereby giving a clear visible index of the concentration of urea present in the blood.

Although the ingredients comprising the composition of this invention are preferably impregnated into a bibulous carrier, this invention can also be used as a liquid system. A convenient liquid system can be prepared by lyophilizing the composition and then reconstituting with the fluid to be tested. If desired, this invention can also be used in the form of tablets, pellets, powders and the like.

If desired, various additives may also be incorporated into the composition of this invention as protective, thickening or wetting agents. For example, thickening agents such as gelatin or wetting agents such as polyvinyl alcohols and polyethylene glycol can be used. A polyethylene glycol such as "Carbowax 4000," having a molecular weight between 3,000 and 3,700, is particularly useful. Protective agents in the form of polymeric films can also be used to enhance the quality of the diagnostic composition of this invention when used with certain forms of test devices, for example, such as bibulous strips. Inert dyes to impart a uniform color background may also be used.

A semi-permeable polymeric film, for example of ethyl cellulose, can be used as a dialyzing membrane to keep the larger molecules present in the fluid being tested, such as hemoglobin in blood, out of contact with the diagnostic composition while at the same time permitting the remaining portions of the fluid, including any urea present, to pass therethrough and contact the test composition. As a result, staining of the test composition by the hemoglobin in whole blood and the masking red color resulting therefrom are avoided. The aforementioned large molecules can be readily washed or wiped off the polymeric film to permit observation of any resulting color change in the indicator. Further, the polymeric film protects the diagnostic composition from decomposition. Although ethyl cellulose is the preferred polymer other semi-permeable film forming polymeric materials can be used if desired.

This invention is illustrated in greater detail in, but is not limited by the following examples:

Example I

The composition is formulated as follows:

| | |
|---|---|
| Gelatin _____g__ | 0.5 |
| Urease _____g__ | 0.5 |
| Acetamide _____g__ | 1.0 |
| 4% "Carbowax 4000" (polyethylene glycol) __ml__ | 11.5 |
| 0.1 M Ammonium citrate buffer (dibasic) ___ml__ | 2.5 |
| 1.6% aqueous solution bromthymol blue _____ml__ | 3.8 |
| Bovine albumin _____g__ | 0.5 |

The gelatin was added to 11.5 ml. of water and heated until completely dissolved. The remaining ingredients, were combined and then mixed with the solution of gelatin until a clear solution was obtained. The temperature of the final solution was approximately 30° C. The solution pH was then adjusted to a pH of about 6.5 by the addition of small quantities of dilute sodium hydroxide. Paper strips measuring 2″ by ¼″ were then dipped in the solution and air dried at a temperature of 85° C. The dried strips were then coated with a semi-permeable polymeric film by dipping them into a 1.25% solution of ethyl cellulose in benzene, and allowing them to air dry until the benzene completely evolved.

A second set of strips was prepared by the procedure of Example I with the exception that no bovine albumin was used in the reagent solution. The following testing procedure was then followed in determining BUN levels using one strip from each set.

Both strips were moistened with one drop samples of blood containing 28 mg. percent urea. After a two-minute incubation period at room temperature the blood was removed by washing with water. The developed colors of both series of strips were immediately compared to color standards which had been previously correlated to indicate the concentration of blood urea nitrogen present in the blood sample. After 60 second had elapsed, the developed colors of both strips were again compared to color standards.

The initial indication by both strips was that a urea concentration of between 25 mg. percent and 30 mg. percent was present in the blood tested. After sixty (60) seconds had elapsed, however, the strip albumin indicated a urea concentration of between 20 mg. percent and 25 mg. percent while the strip without albumin indicated a urea concentration of between 5 mg. percent and 10 mg. percent. Color interpretations at time intervals of about 30 seconds and 90 seconds gave approximately the same degree of difference in the amount of urea indicated the strip containing albumin exhibiting markedly improved color stability compared to the other strip.

Example II

The procedure of Example I was repeated with the exception that the sensitizing agent acetamide used in Example I was replaced with acrylamide and the bovine albumin was replaced with egg albumin. The results obtained were substantially identical to those obtained in Example I.

Example III

The procedure of Example I was repeated with the exception that about 0.05 g. of tris(hydroxymethyl) aminomethane (TRIS) was added to the solution of ingredients and the ammonium citrate buffer omitted. Citric acid was used to adjust the pH of the solution to about 6.0. The results obtained were substantially identical to those obtained in Example I.

It is apparent from the above examples that the compositions containing albumin retained their analytical effectiveness over extended periods of time. The compositions without albumin, on the other hand exhibited analytical inaccuracies if the color interpretation was delayed.

What is claimed is:

1. A test composition for detecting urea present in a fluid which comprises urease, a pH indicator, a buffer, and as a color stabilizer, from about 0.1% to about 10% by weight of albumin.

2. A test composition as in claim 1 wherein the buffer is an ammonium ion producing compound.

3. A test composition as in claim 1 wherein said buffer is selected from the group consisting of ammonium citrate, ammonium lactate, ammonium oxalate, ammonium benzoate, ammonium acetate, ammonium salicylate, ammonium stearate, ammonium propionate, ammonium butyrate, ammonium phosphate, tris(hydroxymethyl) amino methane, 2-amino - 2 - methyl - 1,3 - propanediol, imidazole, 4-aminopyridine, 2-amino-2-methyl-1-propanol hexamethylenediamine, substituted imidazoles, and acid salts of said amines.

4. A test composition as in claim 1 which additionally comprises from about 0.5% to about 10% by weight of a sensitizing agent selected from the group consisting of acetamide, propionamide, acrylamide and butyramide.

5. A test composition as in claim 4 wherein the sensitizing agent is acetamide.

6. A test composition for detecting urea which comprises urease, bromthymol blue, a tris(hydroxymethyl) amino methane buffer and from about 0.1% to about 10% by weight of a color stabilizer selected from the group consisting of bovine albumin and egg albumin.

7. A test device for detecting urea present in a fluid which comprises a carrier member and the dry solids remaining after said carrier member is incorporated with a solution comprising urease, an indicator which undergoes a color reaction in response to a pH change, albumin and a buffer, said albumin being present in a concentration of from about 0.1% to about 10% by weight.

8. A test device as in claim 7 wherein the carrier member is a bibulous cellulose strip.

9. A test device as in claim 7 wherein the solution has a pH between the midpoint of the transition interval of the indicator and a point adjacent to and on the acid side of said transition interval.

10. A test device as in claim 7 which additionally comprises a sensitizing agent selected from the group consisting of acetamide, propionamide, acrylamide and butyramide, said sensitizing agent being present in a concentration of from about 0.5% to about 10% by weight.

11. A test device as in claim 7 wherein the carrier member is coated with a semi-permeable polymeric film.

12. A method for detecting urea in a fluid which comprises contacting the fluid which may contain urea, with a composition comprising urease, a pH indicator, a buffer and, as a color stabilizer, from about 0.1% to about 10% by weight of albumin and observing the results thereby optained.

13. The method according to claim 12 wherein the albumin is selected from the group consisting of bovine albumin and egg albumin.

14. The method according to claim 12 wherein the buffer is an ammonium-ion producing compound.

15. The method according to claim 12 wherein the composition additionally comprises from about 0.5% to about 10% by weight of a sensitizing agent selected from the group consisting of acetamide, propionamide, acrylamide and butyramide.

16. The method according to claim 12 wherein the composition is incorporated with a carrier member.

17. The method according to claim 16 wherein the carrier member is coated with a semi-permeable polymeric film and the method is utilized for detecting urea in whole blood.

18. The method according to claim 17 which additionally comprises the step of washing the carrier member to remove the excess whole blood prior to reading the results obtained.

References Cited

UNITED STATES PATENTS

| | | | |
|---|---|---|---|
| 2,987,450 | 6/1961 | Albaum et al. | 145—103.5 |
| 3,066,081 | 11/1962 | Rorem et al. | 195—103.5 |
| 3,145,086 | 8/1964 | Free et al. | 195—103.5 |

ALVIN E. TANENHOLTZ, *Primary Examiner.*